United States Patent [19]
Siegemund

[11] 3,741,498
[45] June 26, 1973

[54] APPARATUS FOR RECEPTION OF A CASSETTE WITH A RECORDING CARRIER MATERIAL

[75] Inventor: Richard Siegemund, Saint Georgen, Black Forest, Germany

[73] Assignee: Firma Dual Gerbruder Steidinger, Georgen/Schwarzwald, Germany

[22] Filed: Dec. 29, 1971

[21] Appl. No.: 213,279

[30] Foreign Application Priority Data

Jan. 2, 1971 Germany.................. P 21 00 092.0

[52] U.S. Cl................................. 242/199, 274/4 C
[51] Int. Cl.... G03b 1/04, G11b 15/32, G11b 23/04
[58] Field of Search............................242/197–200; 274/4 B, 4 C, 11 B, 11 C; 235/61–61.11

[56] References Cited

UNITED STATES PATENTS

| | | | |
|---|---|---|---|
| 3,395,871 | 8/1968 | Ackermann et al. | 242/198 |
| 3,514,050 | 5/1970 | Yamamoto et al. | 242/198 |
| 3,555,245 | 1/1971 | Lemelson | 235/61.11 |
| 3,583,656 | 6/1971 | Protas | 242/199 |

*Primary Examiner*—Leonard D. Christian
*Attorney*—Ernest G. Montague

[57] ABSTRACT

An apparatus for receiving a cassette containing a band-like recording carrier capable of being rewound in a reproduction device, which comprises a cassette, and a band constituting a recording carrier. Holding means are provided for the cassette disposed on opposite sides of the latter and adjustable in a direction towards each other. The sensing plane of the band is disposed within the range of one side of the cassette arranged substantially perpendicularly to the adjustment direction of the holding means. The holding means engaging the sensing side of the cassette have a symmetrical, substantially V-shaped recess, the latter being formed such, that the center of the cassette in relation to the thickness of the cassette upon impression of the cassette into the V-shaped recess assumes coincidence with the plane of symmetry of the V-shaped recess.

2 Claims, 2 Drawing Figures

Figure 1:
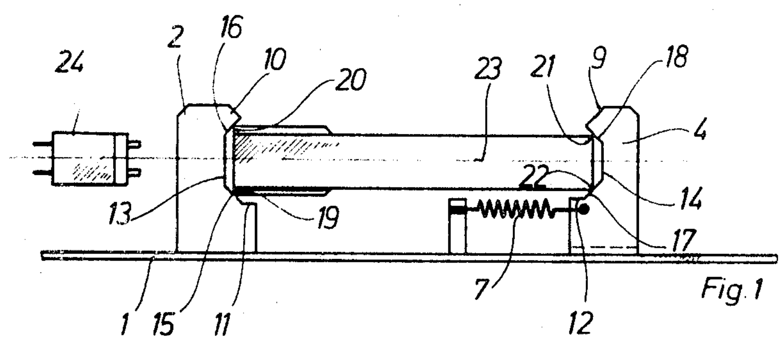

INVENTOR
Richard Siegmund
By Ernest G. Montague
attorney

APPARATUS FOR RECEPTION OF A CASSETTE WITH A RECORDING CARRIER MATERIAL

The present invention relates to an apparatus for receiving a cassette with a band-shaped recording carrier, capable of being rewound, in a receiving- or reproduction-device.

In cassettes which contain a recording carrier, which is capable of being rewound, the position of the recording carrier relative to the device or of the magnet heads and the corresponding tone carrier-guide- and driving-means is determined by the position of the cassette, for which reason a correct position of the cassette in the device is of importance. This applies in particular for band-shaped recording carriers concerning their position cross-wise to the longitudinal direction in the band plane. If a band is distorted by non-coincidence of the guide means with the band position determined by the cassette position in the mentioned direction, a number of drawbacks can be recognized, which effect in the last analysis the quality of the recording or the production. Since the band guiding means determines the position from the band to the head conventionally only within predetermined limits, an incorrect band position has its effect, inspite of the guide means, also on the position to the head. In addition to an exact position of the cassette, it is furthermore generally necessary, to secure the same against the effect of a spring in its position.

The manner of the known cassette receiving devices uses the bottom side of the flatly disposed cassette for the position determination concerning the height position, by pressing the cassette with a spring against this face. The height or level position of the band to this face varies however, with the thickness of the cassette and the latter can vary for about 0.4 mm. In another receiving device the lower cassette wall is received within the range of a bore in the wall in a groove corresponding with the wall thickness, whereby the groove is disposed in a guide pin secured to the device. The cassette is pressed radially by means of a spring against the guide pin, two of which are present. In this manner of the reception in addition to the thickness tolerance of the cassette, also the necessary air between the groove width and the cassette wall thickness effects the band position.

It is one object of the present invention to provide an apparatus for the reception of a cassette with a band shaped recording carrier capable of being rewound, wherein the cassette is received such, that the position of the band to the device in case of use of different cassettes is as much as possible the same.

It is another object of the present invention to provide an apparatus for receiving a cassette with a band-shaped recording carrier, capable of being rewound, in a receiving- or reproduction-device, wherein the cassette is capable of being wedged-in in the direction perpendicular to the band plane disposed in the sensing range between clamping jaws movable relative to each other in this direction, which clamping jaws have at least on the side of the cassette pointing towards the magnetic head a V-shaped recess.

Figure 2:
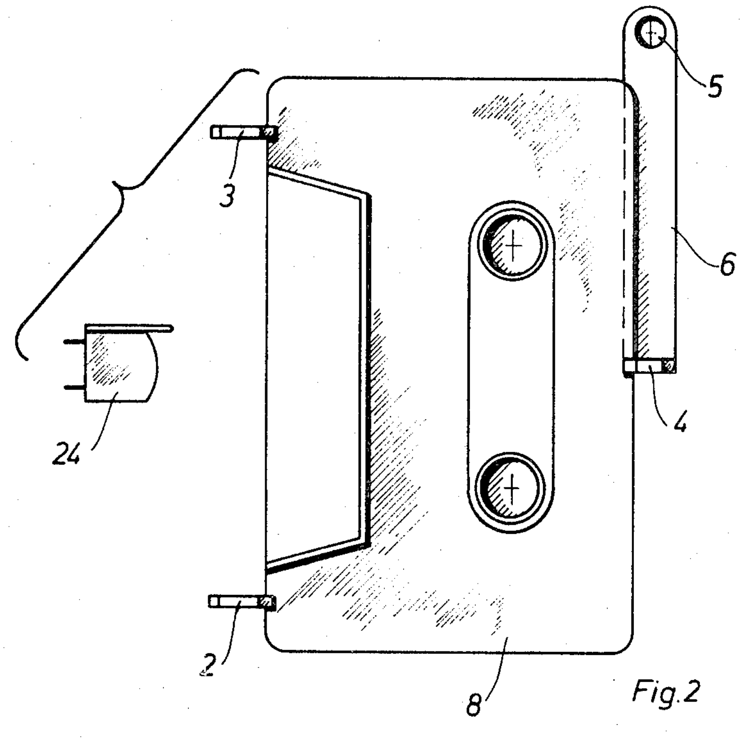

With these and other objects in view, which will become apparent in the following detailed description, the present invention, which is shown by example only, will be clearly understood in connection with the accompanying drawing, in which:

FIG. 1 is a side elevation of a receiving device designed in accordance with the present invention; and FIG. 2 is a top plan view thereof.

Referring now to the drawings, on a base plate 1 are provided immovably two clamping jaws 2 and 3 and a third clamping jaw 4 is adjustably arranged by means of a lever 6 rotatably mounted about a pin 5. The lever 6 is connected with a spring 7, which has the tendency to move the third clamping jaw 4 towards the two oppositely disposed clamping jaws 2 and 3. Upon insertion of a cassette 8 into the device, the movable clamping jaw is pushed backwardly against the force of the spring 7. This can be brought about such, that the cassette 8 is pressed towards oblique inserting faces 9 and 10 of the clamping jaws 2, 3, and 4 or also by other service elements of the device (not shown), which retain the third clamping jaw 4 in a withdrawn position, from which it is freed again upon insertion of the magnet head 24 into the cassette 8. Upon insertion, the cassette 8 comes to lie at first on shoulders 11 and 12 of the clamping jaws 2, 3 and 4, yet slides in then due to the effect of the spring 7 so deeply into the V-shaped opening 13 and 14 of the clamping jaws 2, 3, and 4 until both oblique faces 15 and 16 or 17 and 18 of the V-shaped opening come into engagement with the edges 19 and 20 or 21 and 22 of the cassette 8. By this arrangement the cassette 8 is always in the same position with its median plane 23 relative to the clamping jaws 2, 3, and 4 and is thereby brought into register with the device, regardless of a different thickness of the cassette. By the use of three clamping jaws a non-determination in the position of the cassette is excluded.

While I have disclosed one embodiment of the present invention it is to be understood, that this embodiment is given by example only and not in a limiting sense.

I claim:

1. An apparatus for receiving a cassette containing a band-like recording carrier capable of being rewound in a reproduction device, comprising a cassette, a band constituting a recording carrier, holding means for said cassette disposed on opposite sides of the latter and adjustable in a direction towards each other, the sensing plane of said band disposed within the range of one side of said cassette arranged substantially perpendicularly to the adjustment direction of said holding means, said holding means engaging the sensing side of said cassette having a symmetrical, substantially V-shaped recess, the latter being formed such, that the center of said cassette in relation to the thickness of said cassette upon impression of said cassette into said V-shaped recess assuming coincidence with the plane of symmetry of said V-shaped recess.

2. The apparatus, as set forth in claim 1, wherein said holding means comprise substantially V-shaped holding elements, on the band sensing side of said cassette is arranged one of said holding elements in front of and another of said holding elements is arranged behind said sensing location of said band, a third holding element is disposed on the opposite side of said cassette within the range between said two first mentioned holding elements, and spring means operatively connected with one of said adjustable holding elements and effective in the direction towards an oppositely disposed of said holding elements.

* * * * *